United States Patent Office 3,749,720
Patented July 31, 1973

---

3,749,720
PYRIDAZINOTHIONOPHOSPHORIC (PHOSPHONIC) ACID ESTERS
Christa Fest, Wuppertal-Elberfeld, Ingeborg Hammann, Cologne, and Günter Unterstenhöfer, Opladen, Germany, assignors to Bayer Aktiengesellschaft, Leverkusen, Germany
No Drawing. Filed Oct. 1, 1971, Ser. No. 185,808
Claims priority, application Germany, Oct. 10, 1970,
P 20 49 813.9
Int. Cl. C07d 51/04
U.S. Cl. 260—250 A                     9 Claims

ABSTRACT OF THE DISCLOSURE

Pyridazinothionophosphoric(phosphonic) acid esters of the general formula

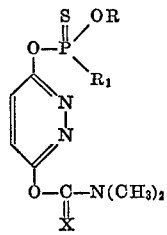

(I)

in which

R is alkyl with 1–6 carbon atoms,
$R_1$ is alkyl or alkoxy with 1–6 carbon atoms or phenyl, and
X is oxygen or sulfur,
which possess insecticidal, acaricidal, nematocidal and rodenticidal properties.

---

The present invention relates to and has for its objects the provision of particular new pyridazinothionophosphoric(phosphonic) acid esters, i.e. O,O-dialkyl-O-[6-dimethylamino carbonyloxy-pyridazin(3)yl] - thionophosphoric acid esters, the corresponding alkane- and benzene-thionophosphoric acid esters and their dimethylamino(thiocarbonyloxy-analogues, which possess insecticidal, acaricidal, nematocidal and rodenticidal properties, active compositions in the form of mixtures of such compounds with solid and liquid dispersible carrier vehicles, and methods for producing such compounds and for using such compounds in a new way especially for combating pests, e.g. insects, acarids, nematodes and rodents, especially insects and acarids, with other and further objects becoming apparent from a study of the within specification and accompanying examples.

It is known from German published specification 1,018,-870 that pyridazinothionophosphoric acid esters, such as O,O-dimethyl-O-[6-hydroxy-pyridazin(3)yl]-thiono phosphoric acid ester (Compound A), possess insecticidal and acaricidal properties.

The present invention provides pyridazinothionophosphoric(phosphonic) acid esters of the formula:

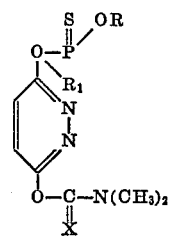

(I)

in which

R is alkyl with 1–6 carbon atoms,
$R_1$ is alkyl or alkoxy with 1–6 carbon atoms or phenyl, and
X is oxygen or sulfur.

These compounds have been found to exhibit strong insecticidal, acaricidal, nematocidal and rodenticidal properties.

The present invention also provides a process for the production of a pyridazinothionophosphoric(phosphonic) acid ester of the Formula I in which a pyridazinothionophosphoric(phosphonic) acid ester of the formula:

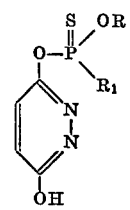

(II)

is reacted, in the form of an alkali metal salt, alkaline earth metal salt, or ammonium salt or in the presence of an acid-binding agent, with an N,N-dimethylcarbamic acid chloride or N,N-dimethylthionocarbamic acid chloride of the formula:

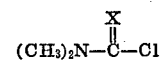

(III)

in which formulae R, $R_1$ and X have the meanings stated above.

Surprisingly, the pyridazinothionophosphoric(phosphonic) acid esters according to the invention show a substantially better insecticidal, acaricidal, nematocidal and rodenticidal activity than the known hydroxy-pyridazinothionophosphoric acid esters of analogous constitution and of the same direction of activity. The substances according to the invention therefore represent a genuine enrichment of the art.

If O,O-diethyl-O-[6 - hydroxypyridazin(3)yl]-thionophosphoric acid ester and N,N-dimethylthionocarbamic acid chloride are used as starting materials, the reaction course can be represented by the following formula scheme:

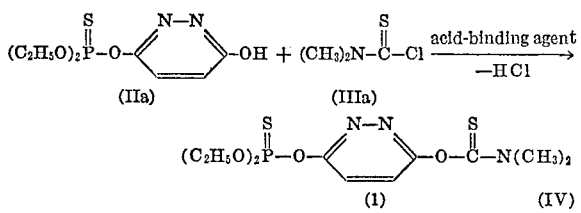

Preferably, R is a straight-chain or branched lower alkyl radical with 1 to 3 carbon atoms, such as methyl, ethyl, n- or iso-propyl, $R_1$ is a straight-chain or branched lower alkyl radical of the above meaning or a lower alkoxy radical with 1 to 3 carbon atoms, such as methoxy, ethoxy, n- or iso-propoxy, or a phenyl radical, while X is preferably an oxygen atom.

As examples of pyridazinothionophosphoric(phosphonic) acid esters which can be used, there are mentioned in particular: O,O-dimethyl-, O,O-diethyl-, O,O-dipropyl, O,O-di-isopropyl, O,O-di-tert.-butyl-, O-methyl-O-ethyl-, O-ethyl-O-iso-propyl-, O-ethyl-O-tert.-butyl-O-[6-hydroxypyridazin(3)yl]-thionophosphoric, further, O-methylmethane, O-ethyl-methane, O-iso-propyl-methane-, O-methyl-ethane-, O-ethyl-ethane-, O-iso-propyl-ethane-, O-butyl-ethane-, O-iso-propyl-tert.-butane-, O-tert.-butylethane-, O-propyl-tert.-butane-, O-methyl-benzene-, O-ethyl-benzene-, O-iso-propyl-benzene- and O-tert.-butylbenzene-O-[6-hydroxy-pyridazin(3)yl]-thionophosphonic acid esters.

The N,N-dimethyl thiono-carbamic acid chlorides to be used as starting materials are known and can be prepared according to customary methods, as can be hydroxypyridazinothionophosphoric(phosphonic) acid esters according to the disclosure of DAS (German published specification) 1,018,870.

The process according to the present invention is preferably carried out with the use of suitable solvents or diluents. As such, practically all inert organic solvents are suitable. These include, above all, aliphatic and aromatic optionally chlorinated hydrocarbons, such as benzene, toluene, xylene, benzine, methylene chloride, chloroform, carbon tetrachloride, chlorobenzene, ethers, such as diethyl and dibutyl ether, dioxane; further, ketones, for example acetone, methylethyl, methyl-iso-propyl and methyl-iso-butyl ketone; nitriles, such as acetonitrile and propionitrile; and alcohols, such as methanol, ethanol or propanol.

As acid acceptors, all customary acid-binding agents can be used; particularly good results have been obtained with alkali metal carbonates and alcoholates, such as sodium and potassium carbonate, methylate or ethylate; further, aliphatic, aromatic and heterocyclic amines, for example triethylamine, dimethylamine, dimethylaniline, dimethylbenzylamine and pyridine.

The reaction temperature can be varied within a fairly wide range. In general, the reaction is carried out at from about 10 to 120° C., preferably at about 50 to 70° C.

The reaction is, in general, carried out at normal pressure.

In carrying out of the process, the starting materials are in most cases used in equimolar proportions. An excess of one or other of the reaction components seems to bring no substantial advantages. The reaction is preferably carried out in the presence of one of the abovementioned solvents, as well as in the presence of an acid acceptor, at the temperatures stated; after several hours stirring—optionally with heating—the reaction mixture is worked up as usual.

The substances according to the invention are in most cases obtained in the form of colorless to slightly yellow-colored, viscous, water-insoluble oils which cannot be distilled without decomposition but can, by so-called "slight distillation," i.e. by prolonged heating at moderately elevated temperatures under reduced pressure, be freed from the last volatile components and in this way can be purified. Elemental analyses are particularly useful for their characterization.

As already mentioned, the new pyridazinothionophosphoric(phosphonic) acid esters are distinguished by an outstanding insecticidal and acaricidal (including tickicidal) effectiveness against pests such as crop pests, hygiene pests and pests of stored products. They possess a good activity against both sucking and eating insects, and mites (Acarina). At the same time, they exhibit a low phytotoxicity, and also nematocidal and rodenticidal properties.

For these reasons, the compounds according to the invention can be used with success as pesticides in crop protection and the protection of stored products, as well as in the hygiene and veterinary field.

To the sucking insects contemplated herein there belong, in the main, aphids (Aphidae) such as the green peach aphid (Myzus persicae), the bean aphid (Doralis fabae), the bird cherry aphid (Rhopalosiphum padi), the pea aphid (Macrosiphum pisi) and the potato aphid (Macrosiphum solanifolii), the currant gall aphid (Cryptomyzus korschelti), the rosy apple aphid (Sappaphis mali), the mealy plum aphid (Hyalopterus arundinis) and the cherry blackfly (Myzus cerasi); in addition, scales and mealybugs (Coccina), for example the oleander scale (Aspidiotus hederae) and the soft scale (Lecanium hesperidum) as well as the grape mealybug (Pseudococcus maritimus); thrips (Thysanoptera), such as Hercinothrips femoralis, and bugs, for example the beet bug (Piesma quadrata), the red cotton bug (Dysdercus intermedius), the beg bug (Cimex lectularius), the assassin bug (Rhodnius prolixus) and Chagas' bug (Triatoma infestans) and, further, cicadas, such as Euscelis bilobatus and Nephotettix bipunctatus; and the like.

In the case of the biting insects contemplated herein, above all there should be mentioned butterfly caterpillars (Lepidoptera) such as the diamond-back moth (Plutella maculipennis), the gypsy moth (Lymantria dispar), the browntail moth (Euproctis chrysorrhoea) and ten caterpillar (Malacosoma neustria); further, the cabbage moth (Mamestra brassicae) and the cutworm (Agrotis segetum), the large white butterfly (Pieris brassicae) the small winter moth (Cheimatobia brumata), the green oak tortrix moth (Tortrix viridanna), the fall armyworm (Laphygma frugiperda) and cotton worm (Prodenia litura), the ermine moth (Hyponomeuya padella), the Mediterranean flour moth (Ephestia kühniella) and greater wax moth (Galleria mellonella); and the like.

Also to be classed with the biting insects contemplated herein are beetles (Coleoptera), for example the granary weevil (Sitophilus granarius-Calandra granaria), the Colorado beetle (Leptinotarsa decemlineata), the dock beetle (Gastrophysa viridula), the mustard beetle (Phaedon cochleariae), the blossom beetle (Meligethes aeneus), the raspberry beetle (Byturus tomentosus), the bean weevil (*Bruchidius-Acanthoscelides obtectus*), the leather beetle (*Dermestes frischi*), the khapra beetle (*Trogoderma granarium*), the flour beetle (*Tribolium castaneum*), the northern corn billbug (Calandra or *Sitophilus zeamais*), the drugstore beetle (*Stegobium paniceum*), the yellow mealworm (*Tenebrio molitor*) and the sawtoothed grain beetle (*Oryzaephilus surinamensis*), and also species living in the soil, for example wireworms (Agriotes spec.) and larvae of the cockchafer (*Melolontha melolontha*); cockroaches, such as the German cockroach (*Blattella germanica*), American cockroach (*Periplaneta americana*), Madeira cockroach (Leucophaea or *Rhyparobia maderae*), oriental cockroach (*Blatta orientalis*), the giant cockroach (*Blaberus giganteus* and the black giant cockroach (*Blaberus fuscus*) as well as *Henschoutedenia flexivitta;* further, Orthoptera, for example the house cricket (*Acheta domesticus*); termites such as the eastern subterranean termite (*Reticulitermes flavipes*) and Hymenoptera such as ants, for example the garden ant (*Lasius niger*); and the like.

The Diptera contemplated herein comprise essentially the flies, such as the vinegar fly (*Drosophila melanogaster*), the Mediterranean fruit fly (*Ceratitis capitata*), the housy (*Musca domestica*), the little house flay (*Fannia canicularis*), the black blow fly (*Phormia aegina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acari) contemplated herein there are classed, in particular, the spider mites (Tetranychidae) such as the two-spotted spider mite (*Tetranychus telarius-Tetranychus althaeae* or *Tetranychus urticae*) and the European red mite (*Paratetranychus pilosus-Panonychus ulmi*), gall mites, for example the black currant gall mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

When applied against hygiene pests and pests of stored products, particularly flies and mosquitoes, the process products are also distinguished by an outstanding residual activity on wood and clay, as well as good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), paraffins (e.g. petroleum or mineral oil fractions), chlorinated aliphatic hydrocarbons (e.g. methylene chloride, chloroethylenes, etc.), cycloaliphatic hydrocarbons (e.g. cyclohexane, etc.), alcohols (e.g. methanol, ethanol, propanol, butanol, glycol, etc.) as well as their ethers and esters, amines (e.g. ethanolamine, etc.), ether-alcohols (e.g. glycol monomethyl ether, etc.), ketones (e.g. acetone, methyl ethyl ketone, cyclohexanone, etc.), strongly polar solvents such as nitriles (e.g. acetonitrile, etc.), amides (e.g. dimethyl formamide, etc.) or sulfoxides (e.g. dimethyl sulfoxide, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides, insecticides, rodenticides and nematocides, or fungicides, bactericides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercial marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g./hectare, preferably 40 to 600 g./hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects, nematodes and rodents and more particularly methods of combating at least one of insects and acarids which comprises applying to at least one of (a) such pests, and (b) the corresponding habitat thereof, i.e. the locus to be protected, a correspondingly combative or toxic amount, i.e. a pesticidally effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1

Myzus test (contact action)

Solvent: 3 parts by weight acetone.
Emulsifier: 1 part by weight alkylarylpolyglycol ether.

To produce a suitable preparation of active compound, 1 part by weight of the active compounds is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100% means that all the aphids are killed whereas 0% means that none of the aphids are killed.

The active compounds, the concentrations of the active compounds, the evaluation times and the results can be seen from the following Table 1:

TABLE 1.—MYZUS TEST

| Active compound | Concentration of active compound in percent | Degree of destruction in percent after 1 day |
|---|---|---|
| (A) [pyridazine compound with $O-P(OCH_3)_2$, $S$, $OH$] (known) | 0.1 | 100 |
| | 0.01 | 99 |
| | 0.001 | 60 |
| | 0.0001 | 0 |
| (2) [pyridazine compound with $O-P(S)(C_2H_5)(OC_2H_5)$, $O-C(O)-N(CH_3)_2$] | 0.1 | 100 |
| | 0.01 | 100 |
| | 0.001 | 90 |

EXAMPLE 2

Phaedon larvae test

Solvent: 3 parts by weight acetone.
Emulsifier: 1 part by weight alkylarylpolyglycol ether.

To produce a suitable preparation of active compound, 1 part by weight of the active compound is mixed with the stated amount of solvent containing the stated amount of emulsifier, and the concentrate is diluted with water to the desired concentration.

Cabbage leaves (*Brassica oleracea*) are sprayed with the preparation of the active compound until dripping wet and then infected with mustard beetle larvae (*Phaedon cochleariae*).

After the specified periods of time, the degree of destruction is determined as a percentage: 100% means that all the beetle larvae are killed. 0% means that none of the beetle larvae are killed.

The active compounds, the concentrations of the active compounds, the times of evaluation and the results can be seen from the following Table 2.

TABLE 2.—PHAEDON LARVAE TEST

| Active compound | Concentration of active compound in percent | Degree of destruction in percent after 3 days |
|---|---|---|
| (A) [pyridazine compound with $O-P(OCH_3)_2$, $S$, $OH$] (known) | 0.1 | 100 |
| | 0.01 | 100 |
| | 0.001 | 0 |
| (2) [pyridazine compound with $O-P(S)(C_2H_5)(OC_2H_5)$, $O-C(O)-N(CH_3)_2$] | 0.1 | 100 |
| | 0.01 | 100 |
| | 0.001 | 100 |

EXAMPLE 3

Tetranychus test/resistant

Solvent: 3 parts by weight acetone.
Emulsifier: 1 part by weight alkylarylpolyglycol ether.

To produce a suitable preparation of active compound, 1 part by weight of the active compound is mixed with the stated amount of solvent containing the stated amount of emulsifier and the concentrate so obtained is diluted with water to the desired concentration.

Bean plants (*phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation times and the results can be seen from the following Table 3.

TABLE 3.—TETRANYCHUS TEST/RESISTANT

| Active compound | Concentration of active compound in percent | Degree of destruction in percent after 2 days |
|---|---|---|
| Compound A (known): dimethyl pyridazinyl phosphorothioate — $O-\overset{S}{\underset{\|}{P}}(OCH_3)_2$ on pyridazine-OH | 0.1<br>0.01 | 98<br>0 |
| $O-\overset{S}{\underset{\|}{P}}(OC_2H_5)_2$ on pyridazine $O-\overset{O}{\underset{\|}{C}}-N(CH_3)_2$ (1) | 0.1<br>0.01 | 100<br>100 |
| $O-\overset{S}{\underset{\|}{P}}\overset{C_2H_5}{\underset{OC_2H_5}{\diagup}}$ on pyridazine $O-\overset{O}{\underset{\|}{C}}-N(CH_3)_2$ (2) | 0.1<br>0.01 | 99<br>95 |
| $O-\overset{S}{\underset{\|}{P}}\overset{C_2H_5}{\underset{OC_2H_5}{\diagup}}$ on pyridazine $O-\overset{S}{\underset{\|}{C}}-N(CH_3)_2$ (3) | 0.1<br>0.01 | 100<br>70 |

EXAMPLE 4

Tetranychus test/normally sensitive

Solvent: 1 part by weight acetone.
Emulsifier: 3 parts by weight alkylarylpolyglycol ether.

To produce a suitable preparation of active compound, 1 part by weight of the active compound is mixed with the stated amount of solvent containing the stated amount of emulsifier and the concentrate so obtained is diluted with water to the desired concentration.

Bean plants (Phaseolus vulgaris), which have a height of approximately 10–30 cm., are sprayed with the preparation of the active compound until dripping wet. These bean plants are heavily infested with spider mites (Tetranychus urticae) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation times and the results can be seen from the following Table 4.

TABLE 4
Tetranychus urticae normally sensitive

| Active compound | Concentration of active compound in percent | Degree of destruction in percent after 2 days |
|---|---|---|
| Compound A (known): $O-\overset{S}{\underset{\|}{P}}(OCH_3)_2$ on pyridazine-OH | 0.1<br>0.02<br>0.004 | 100<br>100<br>20 |
| $O-\overset{S}{\underset{\|}{P}}(OC_2H_5)_2$ on pyridazine $O-\overset{O}{\underset{\|}{C}}-N(CH_3)_2$ (1) | 0.1<br>0.02<br>0.004 | 100<br>100<br>100 |
| $O-\overset{S}{\underset{\|}{P}}\overset{C_2H_5}{\underset{OC_2H_5}{\diagup}}$ on pyridazine $O-\overset{O}{\underset{\|}{C}}-N(CH_3)$ (2) | 0.1<br>0.02<br>0.004 | 100<br>98<br>95 |
| $O-\overset{S}{\underset{\|}{P}}\overset{C_2H_5}{\underset{OC_2H_5}{\diagup}}$ on pyridazine $O-\overset{S}{\underset{\|}{C}}-N(CH_3)_2$ (3) | 0.1<br>0.02<br>0.004 | 100<br>98<br>98 |

EXAMPLE 5

Test with parasitizing fly larvae

Solvent: 35 parts by weight ethylenepolyglycolmonomethyl ether.
Emulsifier: 35 parts by weight nonylphenolpolyglycol ether.

To produce a suitable preparation of active compound, 30 parts by weight of the active substance concerned are mixed with the stated amount of solvent containing the proportion stated above of emulsifier, and the concentrate so obtained is diluted with water to the desired concentration.

About 20 fly larvae (Lucilia cuprina) are put into a test-tube which contains about 2 ml. of horse musculature. 0.5 ml. of the preparation of active compound is applied to this horseflesh. After 24 hours, the degree of destruction is determined as a percentage. 100% means that all, and 0% that none, of the larvae have been killed.

The test results obtained can be seen from Table 5.

EXAMPLE 6

Tick test

Solvent: 35 parts by weight ethyleneglycolmonomethyl ether.
Emulsifier: 35 parts by weight nonylphenolpolyglycol ether.

To produce a suitable formulation, 3 parts by weight of the active compound are mixed with 7 parts of the abovementioned solvent-emulsifier mixture, and the emulsion concentrate so obtained is diluted with water to the concentration desired in each case.

Adult, gorged female ticks of the species *Boophilus microplus* (sensitive and resistant, respectively) are immersed for one minute in these preparations of active compound. After immersion of, in each case, 10 female specimens of the various tick species they are transferred to Petri dishes, the bottoms of which are each covered with a correspondingly large disc of filter paper.

After 10 days, the effectiveness of the preparation of active compound is determined by ascertaining the inhibition of egg deposition compared with untreated control ticks. The effect is expressed as a percentage: 100% denoting that eggs ceased to be deposited and 0% signifying that the ticks deposited eggs in the normal amount.

The active compound investigated, the concentration tried, the parasites tested and the findings obtained can be seen from Table 5.

The preparation of the novel compounds is illustrated in the following examples.

EXAMPLE 7

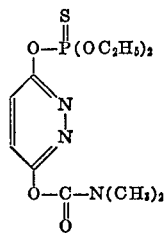

(1)

53 g. (0.2 mole) of O,O-diethyl-O-[6-hydroxypyridazin-(3)yl]-thiono-phosphoric acid ester are dissolved in 200 ml. of acetonitrile; 20 g. (0.2 mole) of triethylamine are added. The mixture is heated to 60° C. and 22 g. (0.2 mole) of dimethylcarbamic acid chloride are added, the mixture is left at this temperature for 3 hours, and is

TABLE 5

| Active compound | Concentration of active compound in p.p.m. | Degree of destruction in percent (*Lucilia cuprina*) | Concentration of active compound in p.p.m. | Inhibition of egg deposition in percent (*Boophilus microplus*) | |
|---|---|---|---|---|---|
| | | | | Ridgeland strain | Biarra strain |
| (2) | 300 / 30 | 100 / 100 | 10,000 / 1,000 | 100 / <50 | >50 / ........ |
| (3) | 300 / 30 | 100 / <50 | 10,000 | >50 | <50 |
| (4) | 300 / 30 / 3 | 100 / 100 / >50 | 10,000 / 1,000 / 100 | 100 / >50 / <50 | >50 / ........ / ........ |
| (1) | 300 / 30 / 3 | 100 / 100 / <50 | 10,000 / 1,000 | 100 / ........ | >50 / <50 | then stirred at room temperature for 10 hours. After filtration from the triethylaminehydrochloride, the filtrate is washed with water and taken up in chloroform, the chloroform layer is dried over calcium chloride, the solvent is drawn off under reduced pressure and the reaction product is slightly distilled in a high vacuum. There are obtained 33 g. (=50% of theory) of O,O-diethyl-O-[6-dimethylaminocarbonyloxy - pyridazin(3)yl]thionophosphoric acid ester.

*Analysis.*—Calc'd for $C_{11}H_{18}N_3O_5PS$ (percent): P, 9.26; S, 9.56. Found (percent): P, 9.57; S, 9.36.

EXAMPLE 8

Analogously, the following compounds are prepared:

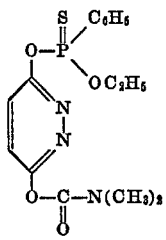

(4)

Yield: 27% of theory, M.P. 112° C.
*Analysis.*—Calc'd for $C_{15}H_{18}N_3O_4PS$ (percent): N, 11.45. Found (percent): N, 11.11.

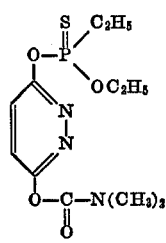

(2)

Yield: 32% of theory, M.P. 135° C. (gassing).

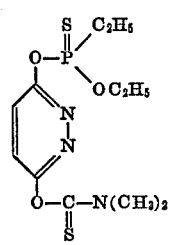

(3)

Yield: 66% of theory.
*Analysis.*—Calc'd for $C_{11}H_{18}N_3O_3PS_2$ (percent): P, 9.26. Found (percent): P, 10.05.

It will be appreciated that the instant specification and examples are set forth by way of illustration and not limitation and the various modifications and changes may be made without departing from the spirit and scope of the present invention.

What is claimed is:
1. A pyridazinothionophosphoric(phosphonic) acid ester of the formula

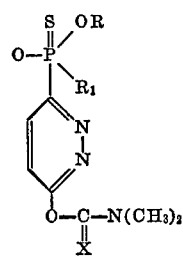

in which
  R is alkyl with 1–6 carbon atoms,
  $R_1$ is alkyl or alkoxy with 1–6 carbon atoms or phenyl, and
  X is oxygen or sulfur.

2. A compound according to claim 1 in which R has 1–3 carbon atoms and $R_1$ is alkyl or alkoxy with 1–3 carbon atoms or phenyl.

3. The compound according to claim 1 wherein such compound is O,O-diethyl-O-[6 - dimethylaminocarbonyloxy-pyridazin(3)yl]-thionophosphoric acid ester of the formula

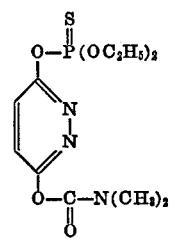

4. The compound according to claim 1 wherein such compound is O-ethyl-O-[6 - dimethylaminocarbonyloxy-pyridazin(3)yl]-benzenethionophosphonic acid ester of the formula

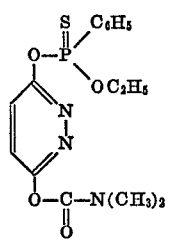

(4)

5. The compound according to claim 1 wherein such compound is O-ethyl-O-[6-dimethylaminocarbonyloxy-pyridazin(3)yl]-ethanethionophosphonic acid ester of the formula

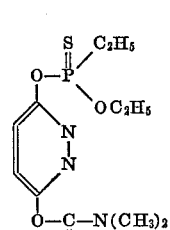

(2)

6. The compound according to claim 1 wherein such compound is O-ethyl-O-[6 - dimethylaminothiocarbonyloxypyridazin(3)yl]-ethanethionophosphonic acid ester of the formula

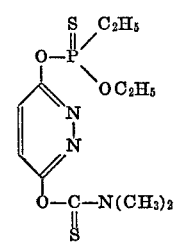

(3)

7. An insecticidal, acaricidal, nematocidal or rodenticidal composition containing as active ingredient a compound according to claim 1 in admixture with a solid or liquefied gaseous diluent or carrier or in admixture with a liquid diluent or carrier containing a surface-active agent.

8. The method of combating insect, acarid, nematocide or rodent pests which comprises applying to the pests or a habitat thereof a compound according to claim 1 alone or in the form of a composition containing it as active ingredient in admixture with a diluent or carrier.

9. The method according to claim 8 in which said compound is

O,O-diethyl - O - [6-dimethylaminocarbonyloxy-pyridazin(3)yl]-thionophosphoric acid ester, O-ethyl - O - [6-dimethylaminocarbonyloxy-pyridazin-(3)yl]-benzenethionophosphonic acid ester, O-ethyl - O - [6-dimethylaminocarbonyloxy-pyridazin-(3)yl]-ethanethionophosphonic acid ester, or O-ethyl - O - [6-dimethylaminothiocarbonyloxy-pyridazin(3)yl]-ethanethionophosphonic acid ester.

References Cited

UNITED STATES PATENTS

| 3,682,905 | 8/1972 | Mirviss | 260—250 A |
| 3,544,572 | 12/1970 | Fest et al. | 260—250 A |
| 3,547,920 | 12/1970 | Fest et al. | 260—250 A |

FOREIGN PATENTS 297,307  6/1954  Switzerland.

OTHER REFERENCES

Lorenz, W., et al.: Ger. Offen. 1, 950, 491 (Apr. 22, 1971).

ALEX MAZEL, Primary Examiner

R. D. McCLOUD, Assistant Examiner

U.S. Cl. X.R.

424—250